United States Patent [19]

Foglia

[11] 4,208,873
[45] Jun. 24, 1980

[54] FLUID FLOW ENERGY EXTRACTING DEVICE OR WIND DAM

[76] Inventor: Vincent Foglia, 171 Hopkinson Ave., Piscataway, N.J. 08854

[21] Appl. No.: 936,481

[22] Filed: Aug. 24, 1978

[51] Int. Cl.$^2$ .......................... F03D 3/00; F03D 11/02
[52] U.S. Cl. ........................................ 60/398; 290/54; 290/55; 415/2; 405/75
[58] Field of Search ..................... 60/398, 407; 290/43, 290/44, 54, 55, ; 405/75; 415/2, 3, DIG. 8; 417/334

[56] References Cited

U.S. PATENT DOCUMENTS 2,485,543  10/1949  Andreau .......................... 290/55 X

FOREIGN PATENT DOCUMENTS 1158989  2/1958  France .......................... 290/55

Primary Examiner—Edgar W. Geoghegan

[57] ABSTRACT

A device for extracting energy from gaseous or liquid fluid flows, comprising two or more foils having openings on the foils' outer surface to tap the low and high pressures created by the fluids passing around them; within each foil there is a partition to keep the pressures separated and each chamber is vented to a manifold; the manifolds channel the pressures to a device which produces mechanical or electrical energy utilizing the pressure differential which has been created.

6 Claims, 2 Drawing Figures

FLUID FLOW ENERGY EXTRACTING DEVICE OR WIND DAM

This invention is a novel means for extracting energy from gaseous or liquid fluid flows. It is comprised of two or more foils. The result is achieved by tapping the low and high pressure areas which envelope a foil when a fluid current passes around it. The efficiency of this phenomena is enhanced by creating a venturi shaped passageway between the foils. More particularly, after the foils have created the separate pressures they enter by means of openings along the foils. Once inside, they are channeled to a device which produces mechanical or electrical energy utilizing the pressure differential which has been created. The device will operate using low pressure alone.

This novel device is fundamentally different from prior machines which generate power from wind or water flows because it has virtually no moving parts exposed to the energy source to be used. If fluid flows over a foil, low and high pressure areas are created whether or not the wind or blade is moving. Instead of allowing the fluid flow energy conversion device to move in some manner, this device remains stationary, taps the pressures, then channels them to opposite sides of a pressure driven apparatus. Examples of such apparatus are: a diaphragm operated or other vacuum motor and, a small high speed turbine (efficiency increases with speed).

Other inventors have patented devices which sought to translate the pressure differentials created about a foil to usable energy, as every windmill or turbine does. Julius D. Modaras, for example, invented a device which created pressure differentials on opposite sides of a vertically rotating cylinder. More recently, Dr. Daniel Schneider has invented a device which is essentially a series of horizontal foils moving vertically. However, to date, no one has tapped and channeled the low and high pressures surrounding a foil as described herein.

The larger the surface area exposed to the fluid flow the more available energy there is to be tapped. There are two problems with a large rotating device necessary in conventional designs to take full advantage of gaseous flows. The wind speed needed to start the device turning is usually high enough so that the effective use of low currents is lost; and in high currents, increased blade tip velocities require the blades to be pitched, teathered or halted to prevent total destruction. For a device to operate efficiently in both low and high wind currents has been a problem. Small rotating devices are able to do this and some inventors have suggested using such devices in a series or group. Cost and the problem of mounting such an arrangement are probably what has prevented developments along these lines. Thus the problem of the efficient uses of the wind at varied speeds remains as a significant obstruction to the use of an abundant energy source.

Devices which are currently in use for liquid fluids rely on relatively high heads of water to generate power. This invention will generate power from now unproductive low head liquid flows such as river, open ocean and tidal currents.

The prime object of this invention is to produce mechanical or electrical energy, using the inherent power available in gaseous and liquid fluid flows.

A second object is that the device operate efficiently in varied fluid flow velocity ranges.

A third object is that with the device's simplicity of design, it will be reasonable in cost of construction.

A fourth object is that with only a few moving parts, the device will be long on durability and low on maintenance.

A fifth object is that the device be designed so as to take the greatest possible advantage of the fluid flows.

Further objects and advantages of this invention will appear from the disclosure of the following detailed description of a preferred embodiment thereof when read with reference to the drawings contained herein. The accompanying drawings for a part of this specification and like numbers, are employed to designate like parts throughout.

This device may be mounted in any advantageous place, a prime concern being that there be no obvious obstructions or impediments to the fluid flow. Some possible locations are: in a stream, the ocean, on the ground, on a tower, high building (top or side), open range, etc.

The device described herein is composed of two or more foils, parallel to each other and mounted in any feasible manner or position. In order to maximize the fluid velocity the foils are constructed so as to create a venturi shaped passageway between them. (FIG. 1. Thus as the fluid enters the front of the device, its velocity is accelerated by the venturi shape present between the foils, thereby creating the low and high pressures to be tapped. Also, constructing the foils to create a venturi shape prevents development of thrust or lift forces. In certain conditions the device can be made to operate effectively using low pressure alone with a static high pressure source.

With this design, there are no high speed rotational or vibrational stresses or extremely critical dimensions. The foils may be constructed from any feasible material. A low drag coefficient is one desirable quality. Possible materials are: fiberglass, sheet metals or a woven fabric stretched on a frame. To withstand stresses caused by high speed fluid currents or sudden changes in direction the foils can be braced. This may be accomplished through wire rigging or any other feasible means. The interior of the foils may be adapted to a number of uses such as, an energy storage system, grain elevator, silo, etc.

For more efficient use of the energy in the entering fluid current, guide vane arrangements may be used. These vanes or fins can be placed upstream, in front, as a means to minimize turbulence of the fluid flow in the venturi created by the foils.

The design and placement of the openings in the foils for the entrance and exit of the high and low pressures is of extreme importance. As the drawings indicate (FIG. 2) the optimum position for the holes in the foils with a venturi shape is near that throat or center of the venturi.

It there is a problem with debris or other foreign matter, the low pressure side only may be used and filtered fluid supplied from a static source; or, the high pressure opening filtered and both sides used. Filtering may be performed by screening or any other feasible means.

Figure 1:
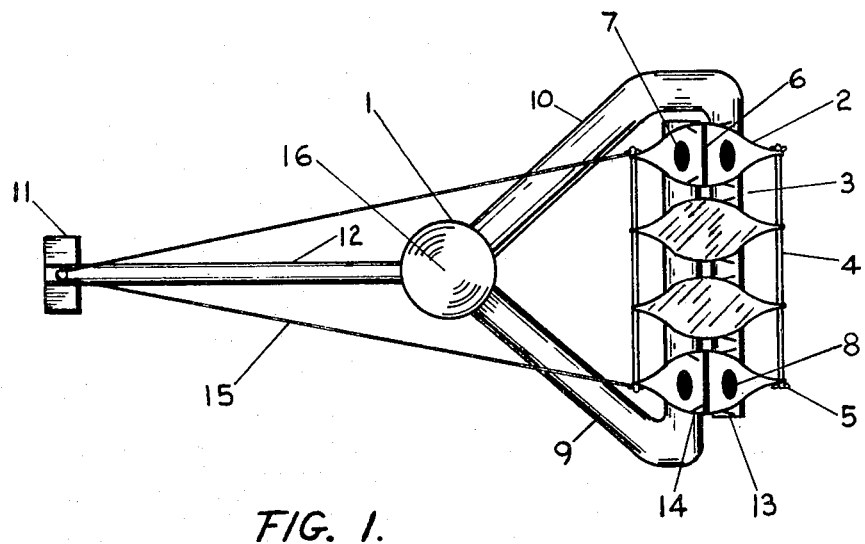
FIG. 1 is an overhead view of an energy producing device which embodies the principles of the present invention.

To minimize the effect of differential pressures which may occur with gaseous fluid flows, a check valve arrangement can be used (FIG. 1 [13 & 14]). A suggested means is to provide at each entrance and exit a flap check valve. The flaps would open toward the inside of the foil on the high pressure side, outside the foil on the low pressure side. Controlling differential pressures may be by any feasible means including other check valve arrangements such as at the manifold entrance, or internal to the foils so as not to interfere with proper fluid flow.

The manifolds (FIGS. 1 & 2 [9 & 10]) which channel the pressures between the foils and the energy connecting device may be constructed from any feasible material. Their design may also vary, but a prime concern is that energy loss in conduction be minimized. As illustrated herein, they are of sufficient strength to support the foils, serving as structural components as well as fluid passages.

It is necessary that the foils be directed into the fluid current, although this design allows for a fairly large angular tolerance. This may be done through any feasible means. The method shown here to accomplish directional changes is by offsetting and counter balancing the foils, (FIG. 2) and allowing the entire device to rotate on a slip fit mechanism. This is commonly known as "downstream" mounting. Another possibility is for the counterweight to be a turbine, a generator, or other energy conversion device.

The drawings are now made reference to in more explicit terms, wherein like numbers are employed to designate like parts throughout, and a preferred design of the device for wind is illustrated.

FIG. 1 is an overhead view of an energy device generally designated (1). It is comprised of a series of airfoils (2) with a venturi shaped space between them (3). The foils are braced and the space adjusted between them by means of the rods (4). The adjustment may be made by threading the tie rod, or any other feasible means. The rods shown here are fastened on the ends by a wind nut (5).

In this view the two middle foils are shown enclosed and covered, and the two outside foils are open ended. Within the foils themselves there is a partition, which divides the high and low pressure sides (6). Numeral (7) refers to the exhaust port to the high pressure manifold (9); numeral (8) refers to the exhaust port to the low pressure manifold (10). The counter-weight (11) and arm (12) are shown and designated. A typical low pressure valve and port (13) and high pressure valve and port (14) are shown herein also.

Figure 2:
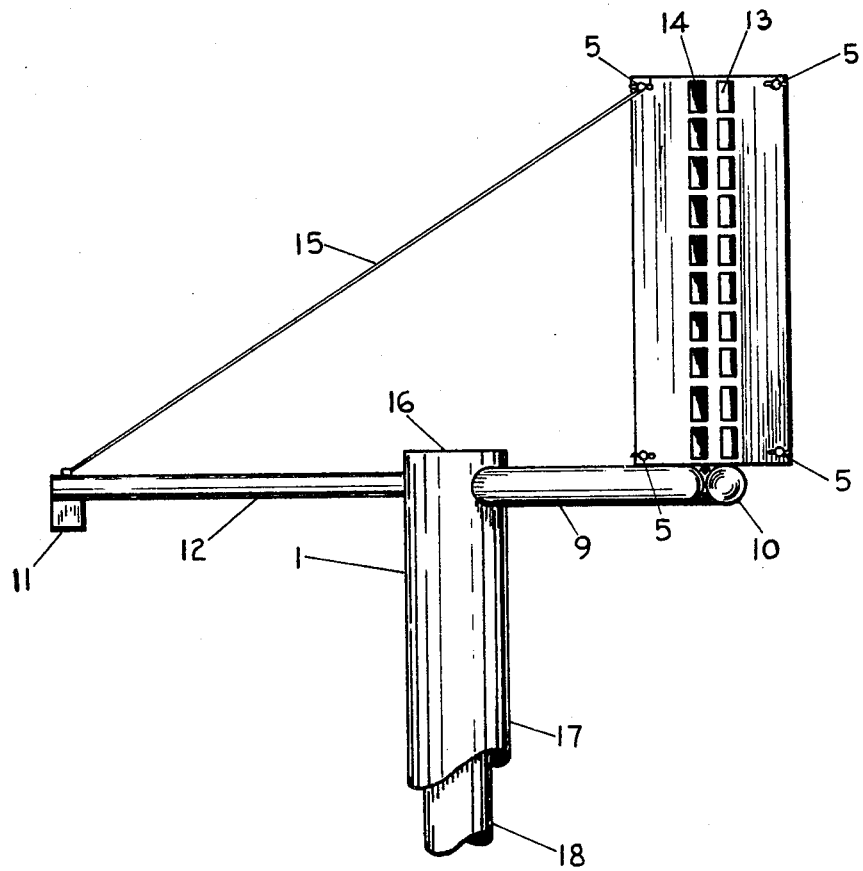
FIG. 2 is a side view of the device of FIG. 1.

FIG. 2 is a side view of the device of FIG. 1, generally designated (1). The foils are braced by a guy wire (15) and spaced by tie rods secured on the end by wing nuts (5). Shown also are the high pressure intake openings (14) and the low pressure exhaust openings (13). They are positioned close to the center of the foil to take full advantage of the venturi design. The entire apparatus is offset and counterbalanced by a weight (11) on an arm (12) extending from the axis (16). The axis itself is designed to allow the device to rotate by means of a slip-fit device which is not shown; this coupled with the offset foils permits them to face into the wind, whichever direction it comes from. The high pressure manifold (9) and low pressure manifold (10) are also shown. The manifolds channel the pressures to the axis which is designed so that the high pressure pipe is the annular space between the outer casing (17) and the support (18) and the low pressure flows downwardly within the support (18).

Obviously, many modifications and variations of the present invention are possible in light of the above teachings. Therefore, it is to be understood that the means and construction of this novel device may be practiced otherwise than as specifically described herein, within the legitimate and valid scope of the appended claims.

The invention claimed is:

1. A device for extracting energy from gaseous or liquid fluid flows, comprising two or more foils, having openings on the foils outer surface to tap the low and/or high pressures created by the fluids passing around them; within each foil there is a partition to keep the pressures separated and each chamber is vented to a manifold; the manifolds channel the pressures to a device which produces mechanical or electrical energy (which can be converted to any other energy form) utilizing the pressure differential which has been created.

2. The device of claim one (1) wherein the foils are parallel to each other, and are designed so that the space between them creates a venturi effect.

3. The device of claim (1) wherein the bracing of the parallel foils allows the space between them to be adjusted.

4. The device of claim one (1) wherein in a check valve system is incorporated to compensate for sudden pressure and flow differential pockets which are encountered in natural fluid flows.

5. The device of claim one (1) wherein the manifolds support the foils, which are offset and counterbalanced on a rotating axis.

6. The device of claim one (1) wherein the available interior space of the foils is adapted to a complimentary use, such as an energy storage system or bulk storage.

* * * * *